US006693662B1

United States Patent
Parker et al.

(10) Patent No.: US 6,693,662 B1
(45) Date of Patent: Feb. 17, 2004

(54) COORDINATION OF VIDEO SESSIONS WHEN CALLING AN AUTO-ATTENDANT SYSTEM

(75) Inventors: Benjamin J. Parker, Overland Park, KS (US); Shane R. Werner, Olathe, KS (US); Charles Diaz, Overland Park, KS (US); Terry M. Frederick, Lenexa, KS (US); Terry T. Yu, Overland Park, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 21 days.

(21) Appl. No.: 10/058,886

(22) Filed: Jan. 28, 2002

Related U.S. Application Data (63) Continuation-in-part of application No. 10/033,813, filed on Dec. 20, 2001, which is a continuation-in-part of application No. 09/978,616, filed on Oct. 16, 2001, now Pat. No. 6,545,697.

(51) Int. Cl.$^7$ .................................................. H04N 7/14
(52) U.S. Cl. ............................... 348/14.01; 379/93.12; 379/93.07
(58) Field of Search .......................... 348/14.01–14.09, 348/14.11–14.13; 379/93.12, 93.07, 93.25, 88.17, 265.01, 265.02, 265.09, 265.11, 265.12, 266.01; 370/352; 709/227, 203, 204

(56) References Cited

U.S. PATENT DOCUMENTS

| 5,764,916 | A | 6/1998 | Busey et al. |
| 5,949,763 | A | 9/1999 | Lund |
| 6,323,894 | B1 * | 11/2001 | Katz ........................ 348/14.08 |
| 6,337,858 | B1 | 1/2002 | Petty et al. |
| 6,370,137 | B1 | 4/2002 | Lund |

FOREIGN PATENT DOCUMENTS

| EP | 1 059 798 | 12/2000 |

* cited by examiner

*Primary Examiner*—Melur Ramakrishnaiah (57) ABSTRACT

Computerized video telephony enhances the interaction between a calling party and a called user wherein the called user is an enterprise employing a computerized, automated telephone response system together with a pool of live human operators or agents. The present invention coordinates the handling of the network data call(s) so that video image content may be provided to the calling user while connected to the automated system and then after the telephone call is transferred to the live operator.

19 Claims, 6 Drawing Sheets

COORDINATION OF VIDEO SESSIONS WHEN CALLING AN AUTO-ATTENDANT SYSTEM

CROSS REFERENCE TO RELATED APPLICATIONS

The present application is a continuation-in-part of pending U.S. application Ser. No. 10/033,813, filed Dec. 20, 2001, entitled "Telephonic Addressing For Establishing Simultaneous Voice and Computer Network Connections", which is a continuation-in-part of prior U.S. application Ser. No. 09/978,616, filed Oct. 16, 2001 now U.S. Pat. No. 6,545,697, entitled "Video Telephony". This application is further related to U.S. applications Ser. Nos. 10/058,549, filed Jan. 24, 2002, entitled "Private Sharing of Computer Resources Over an Internetwork"; 10/058,882, filed Jan. 28, 2002, entitled "Sharing of Prerecorded Motion Video Over an Internetwork"; and 10/058,517, filed Jan. 28, 2002, entitled "Obtaining On-Demand Goods and Services Using Video Telephony," all incorporated herein by reference.

STATEMENT REGARDING FEDERALLY SPONSORED RESEARCH

Not Applicable.

BACKGROUND OF THE INVENTION

1. Field of the Invention

The present invention relates to the coordination of computer network data call(s) or session(s) created to supplement a telephone call made to a semi-automated telephone system. The computer network data call(s) provide video images accessed first from an auto-attendant and then from a live operator after the telephone call is transferred to the operator or agent, for example. Uses of the invention include consumer information, help desk consultation services, and ordering and purchasing of goods or services.

Electronic commerce and other uses of the Internet have rapidly developed. A user may navigate with their web browser to an information provider's (e.g., a seller or manufacturer's) web page to view textual, audio, and graphic information about goods or services prior to making a selection decision or about how to operate, maintain, or repair previously purchased goods or services. While many people have accepted or even embraced the Internet, others are reluctant to use it for many reasons such as unfamiliarity, lack of understanding, worries over security of credit card information, or personal preference. In many instances, it may take a very experienced Internet user to find much of the information that is available. Inexperienced users may have difficulty locating the information they desire or even knowing where to look (i.e., knowing which websites or webpages are relevant).

A more traditional manner of obtaining information from providers of information, goods, or services has been by telephone enquiries (e.g., using toll-free telephone numbers). A drawback of the telephonic method is that information that can be provided is limited to audio information (either prerecorded or spoken by a live operator).

Thus, it would be desirable to provide a means of acquiring information with the simplicity of telephone calls while providing the ability to display video images to the calling person.

2. Description of the Related Art

Internetworking (i.e., the interconnection of many computer networks) allows the interaction of very large numbers of computers and computer users. The most well known example is the Internet. Computers connected to the Internet may be widely separated geographically and utilize many different hardware and software configurations. In order to achieve communication sessions between any two endpoints on the Internet, an addressing system and various standard protocols for exchanging computer data packets have been developed.

Each packet sent over the Internet includes fields that specify the source and destination address of the packet according to Internet Protocol (IP) addresses assigned to the network interface nodes involved. Currently assigned addresses comprise 32 bits, although future standards allow for 128 bit addresses. The 32 bit addresses are normally written by breaking the 32 bits into 4 groups of 8 bits each and writing the decimal equivalents of each group separated by periods (e.g., 208.25.106.10).

Since numerical IP addresses are inconvenient to use and remember, a protocol for assigning and accessing logical names is used known as the domain name system (DNS). DNS servers are deployed within the Internet which perform a translation function between a logical domain name such as "sprint.com" and its numerical equivalent "208.25.106.10". After receiving an IP address back from a DNS server, a computer can forward data packets to the IP address and establish a connection or session with the remote computer.

While the DNS system can work well for hosted content (e.g., material made available for browsing by commercial and private entities), it is not well suited to ad hoc communications or exchanges of data between individuals. Hosting a website and registering an IP address within the DNS system is expensive and time consuming. Furthermore, due to an impending shortage of IP addresses and the cost for maintaining use of each IP address, many Internet service providers assign IP addresses dynamically to their individual users. In other words, when a user signs on to their service, they are temporarily assigned an IP address from an address pool assigned to their service provider. The user occupies that IP address only for their current session.

Even when individual users have their own static IP addresses, and when other users can remember the IP address of a user with whom they would like to establish a connection session over the Internet (e.g., for voice or video telephony), the need to configure their hardware or software is too complex for many users. This is one reason why e-mail is such a popular and successful Internet application. A mail server with an easy to remember domain name acts as intermediary between two individual users. Using a simple application program and the recipient's account name on the mail server (i.e., their e-mail address), text messages and computer files can be exchanged. The exchange, however, does not allow the users to interact in real time. Thus, there is a need for a way to allow two or more individual users to establish interactive connection sessions over the Internet without requiring overt knowledge of the other's IP address and without complicated configurations or set-ups.

Copending applications U.S. Ser. No. 09/978,616 and U.S. Ser. No. 10/033,813 teach the use of a central server allowing two or more individual users to establish interactive connection sessions over the Internet without requiring overt knowledge of the other's IP address and without complicated configurations or set-ups. Each user registers with the central server, resulting in a database of users and their current IP addresses. A calling user sends a request to the central server to establish a connection with a called user. The central server can either relay all network message packets between the users for the duration of a "call", or it may provide the IP addresses to the users so that they can exchange packets directly. The called user may be identified within the database by information well known or easily discovered by other users, such as their telephone number. A telephone call may be established simultaneously with establishing the computer network session, thereby enhancing the user interaction regardless of the type of computer data to be exchanged (e.g., video frames, computer files, etc.). In one embodiment, the computer network session is automatically established in response to the act of dialing the called user's telephone number.

When the called user (e.g., information provider) has an auto-attendant (i.e., a computerized automated telephone response system) for screening and/or directing incoming calls to live human operators or agents, the IP address of the operator that will handle an incoming telephone call cannot be known in advance. Furthermore, it may be very desirable for both the auto-attendant and the live operator to provide video images to the calling user. Network data call set-up must take these factors into account.

SUMMARY OF THE INVENTION

The present invention has the advantage that control of video images transmitted to the calling user is transferred in conjunction with the transfer of the telephone call from an auto-attendant to a live operator.

In one aspect of the invention, a method is provided for video telephony wherein a user interacts with a provider system via a public switched telephone network and a computer network. The provider system includes an auto-attendant resource, a live operator resource, and at least one provider computer, wherein a user computer and the provider computer are connected to the computer network for exchanging network packets therebetween. Each of the computers has a respective private IP address within the computer network. The method includes the user dialing a provider telephone number of the provider system from a user telephone having a user telephone number to establish a telephone call. The auto-attendant resource answers the telephone call. At least one of the provider telephone number or the user telephone number is transmitted to a central server within the computer network. The central server maintains a database of registered users and providers, their telephone numbers, and IP addresses of their computers. The database is checked for the transmitted telephone number. If the transmitted telephone number is found, then a first network session is established between the user computer and the provider computer. First video images are transmitted within the first network session from the provider computer to the user computer under control of the auto-attendant resource. The telephone call is transferred from the auto-attendant resource to the live operator resource. Second video images are transmitted to the user computer under control of the live operator resource.

DETAILED DESCRIPTION OF PREFERRED EMBODIMENTS

Figure 1:
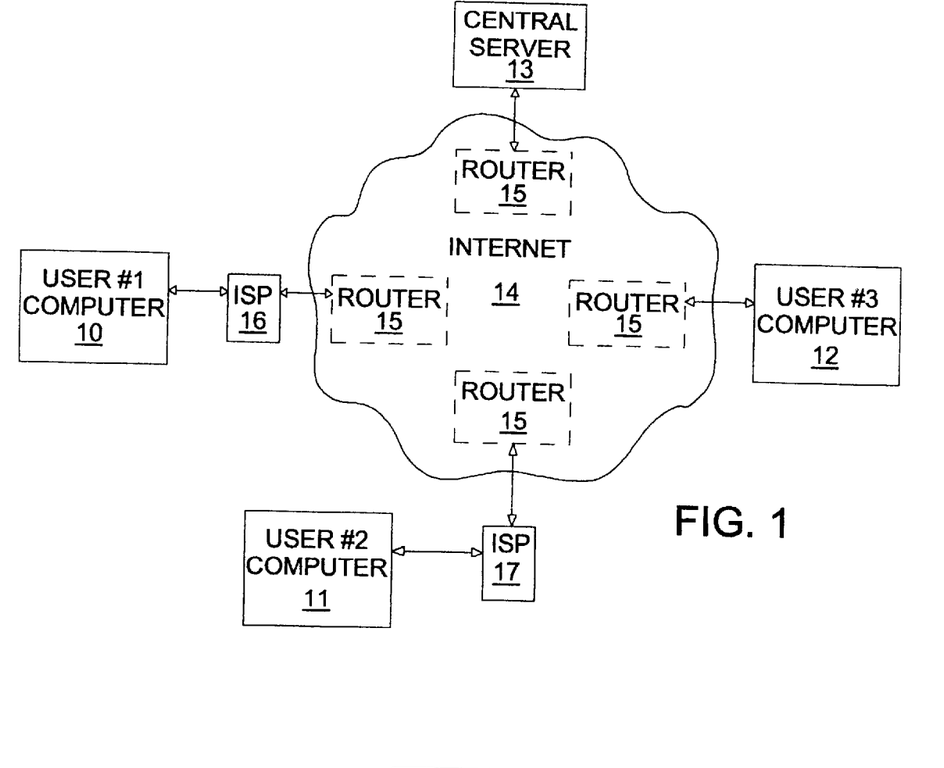
FIG. 1 is a block diagram showing the interconnection of users over the Internet to the central server of the present invention.

Referring to FIG. 1, a plurality of user computers 10, 11, and 12, and a central server 13 are internetworked via the Internet 14. A plurality of routers 15 within Internet 14 direct packets between various endpoints or nodes. Computers 10 and 11 are shown as being connected to Internet routers belonging to Internet Service Providers (ISP's) 16 and 17, respectively. The connections to the ISP's may be by dial-up, digital subscriber line (DSL), cable modem, or integrated access device (IAD), for example. Central server 13 and computer 12 are shown directly connected to a router.

Network communication comprises data messages or packets transferred between separate endpoints, such as between computers 10, 11, or 12 (as clients) and central server 13. The packet transfer is accomplished by routers using the IP addresses contained in each packet. Central server 13 typically has a fixed IP address that is listed on the DNS servers accessible to each computer. Each computer user can easily communicate with central server 13 by supplying its logical name (e.g., www.sprint.exchange.com) which is automatically resolved by their browser into an IP address by consulting a DNS server. Exchanging packets between users 10, 11, and 12 themselves cannot usually be accomplished in the same way because the users and their IP addresses are not listed in the DNS system. Furthermore, users 10, 11, and 12 may not wish to allow remote access into their computers except in certain circumstances.

Figure 2:
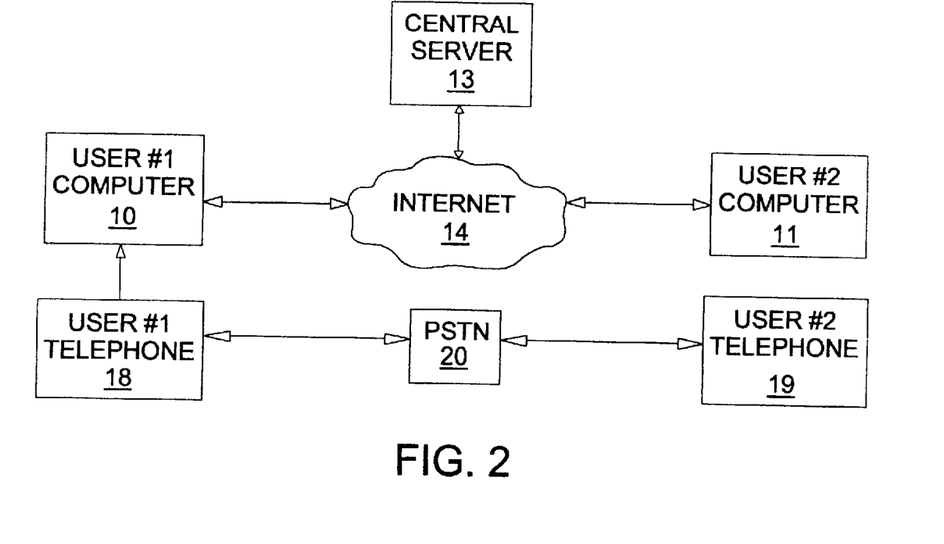
FIG. 2 is a block diagram showing a user connection model.

The present invention facilitates exchanging data messages between two separate, private computers by providing a specialized directory or look-up within central sever 13. As shown in FIG. 2, the present invention may be used within a system that functions to simultaneously establish a voice telephone call between the two individual computer users. In certain embodiments, the voice call serves as the user action that initiates the computer processing to establish the computer-to-computer connection. In addition, the voice call provides a way to alert the called party of the request to establish the computer connection and then serves to enhance the interaction between the two users during the exchange of computer data.

As shown in FIG. 2, computers 10 and 11 have associated telephones 18 and 19 used by the same respective users. The computers and telephones may be fixed installations (e.g., in a residence or a business office) or may be mobile devices (e.g., laptop computer and cellular phone), as long as both are accessible to each user at the same time. The telephones are connected to the public switched telephone network (PSTN) 20. Central server 13 provides a user look-up and interconnecting service for registered users. For security and/or billing purposes, access to the service preferably is tied to user ID's and passwords. A user may be given an ID and password with initial sign-up for the service. Each user would manually configure the telephone number that they want to be associated with. When the user is "on-line" (i.e., has their computer turned on and connected to Internet 14), their computer sends a registration message to central server 13 to notify it that the user is available. Central server 13 can inspect the registration message to determine the current IP address and port number at which the user resides for its current connection session. Alternatively, the user may manually configure their IP address in some circumstances. Upon registration, central server 13 may preferably determine whether the user has a respective firewall as described in copending U.S. application Ser. No. 10/034,012, filed Dec. 20, 2001. In any case, central server 13 contains a database of currently active, registered users. Each user entry in the database includes fields for user ID, password, telephone number, and IP address (including port number), user status, and a firewall flag, for example. When using the invention for e-commerce transactions the user information stored in the database may also include shipping and billing address information and credit card numbers, for example.

In the general connection model of FIG. 2, a user #1 dials telephone 18 to make a voice call to a user #2 at telephone 19. The telephone number dialed by user #1 is captured as a target telephone identifier number and sent to a call client (i.e., an application program for managing the data call) in computer 10 being used by user #1. Computer 10 forwards the target telephone number to central server 13 as part of an access request for establishing a connection with user #2. Central server 13 looks up the target number in its database. When it finds the target number, central server 13 identifies the IP address associated with user #2 and sends an initiation message to computer 11 being used by user #2. When computer 11 receives the initiation message, it launches its own call client (if not already running). The initiation message may identify user #1 (preferably by both telephone number and user ID) and the type of data to be exchanged (i.e., the application program or how the call client should be configured to receive the data). User #2 answers the telephone voice call and learns that an initiation message was sent to their computer. Using computer 11, user #2 can verify the calling party as user #1 and can indicate whether they accept the computer network connection (i.e., the data call) with user #1. Once user #2 accepts, data messages can be exchanged between the call client application programs running on computers 10 and 11. The call client application programs can be written to perform file transfers of various types of files, video data or frames for video telephony, or other real-time data or control signals.

Figure 3:
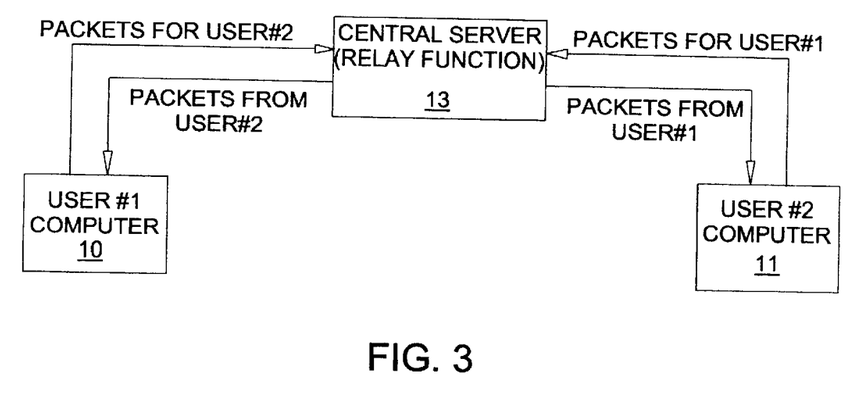
FIG. 3 is a block diagram showing a first embodiment of packet flow for a data call.

A first packet exchange configuration is shown in FIG. 3 wherein central server 13 performs a relay function such that all packets exchanged between computer 10 and computer 11 pass through central server 13. In other words, after a desired user (called party) accepts the data call and central server 13 notifies the first user (calling party) of the acceptance, both endpoints continue to address their sent packets to central server 13. At central server 13, each packet is redirected by substitution of IP addresses. For example, a packet sent from computer 10 including its own IP address as the source address of the packet and the IP address of central server 13 as the destination address of the packet is modified after being received by central server 13 to have the central server's address as its source address and to have the IP address of computer 11 as its destination address. After modification, central server 13 sends the packet back to its router and on to computer 11. The same operations are used to send packets from computer 11 to computer 10. The embodiment of FIG. 3 has the advantage that greater privacy of a user's IP address is maintained since each user's computer only needs to see the IP address of central server 13. Furthermore, this configuration can readily function in the presence of network address translation (NAT) firewalls at the endpoints.

Figure 4:
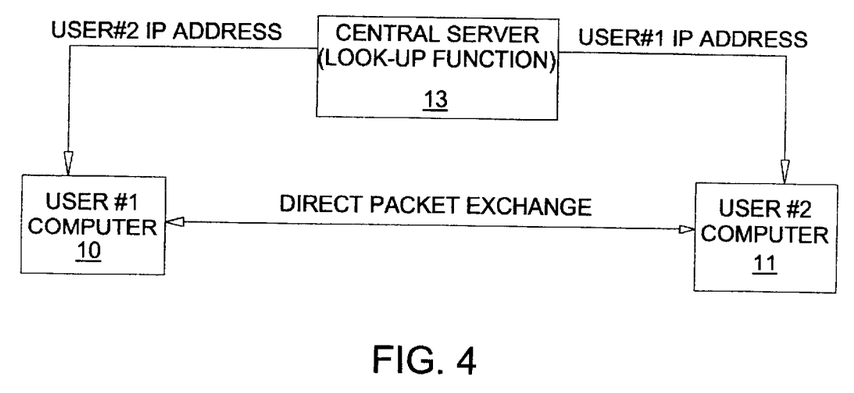
FIG. 4 is a block diagram showing a second embodiment of packet flow for a data call.

FIG. 4 shows an alternative configuration in which direct packet exchange between computers 10 and 11 is realized. Central server 13 provides a look-up function and a connection initiation function. If desired user #2 (called party) accepts a data call, then central server 13 provides the IP address of computer 11 to computer 10 and provides the IP address of computer 10 to computer 11. Thereafter, each computer can send packets addressed to the other computer and the packets are no longer relayed through central server 13. This embodiment has the advantage that central server 13 may be reduced in size since less traffic flows through it.

In the situation that the called user is a commercial enterprise having a telephone system including a computerized, automated telephone response system (referred to herein as an auto-attendant) and the calling user desires to have their telephone call eventually connected to a live operator or other resources that are organized in a pool with a plurality of telephone numbers or extensions, the calling user does not have knowledge of the telephone number of the operator to which the telephone call may be transferred. The present invention coordinates the handling of the network data call(s) so that video image content may be provided to the calling user seamlessly during each phase of the call.

Figure 5:
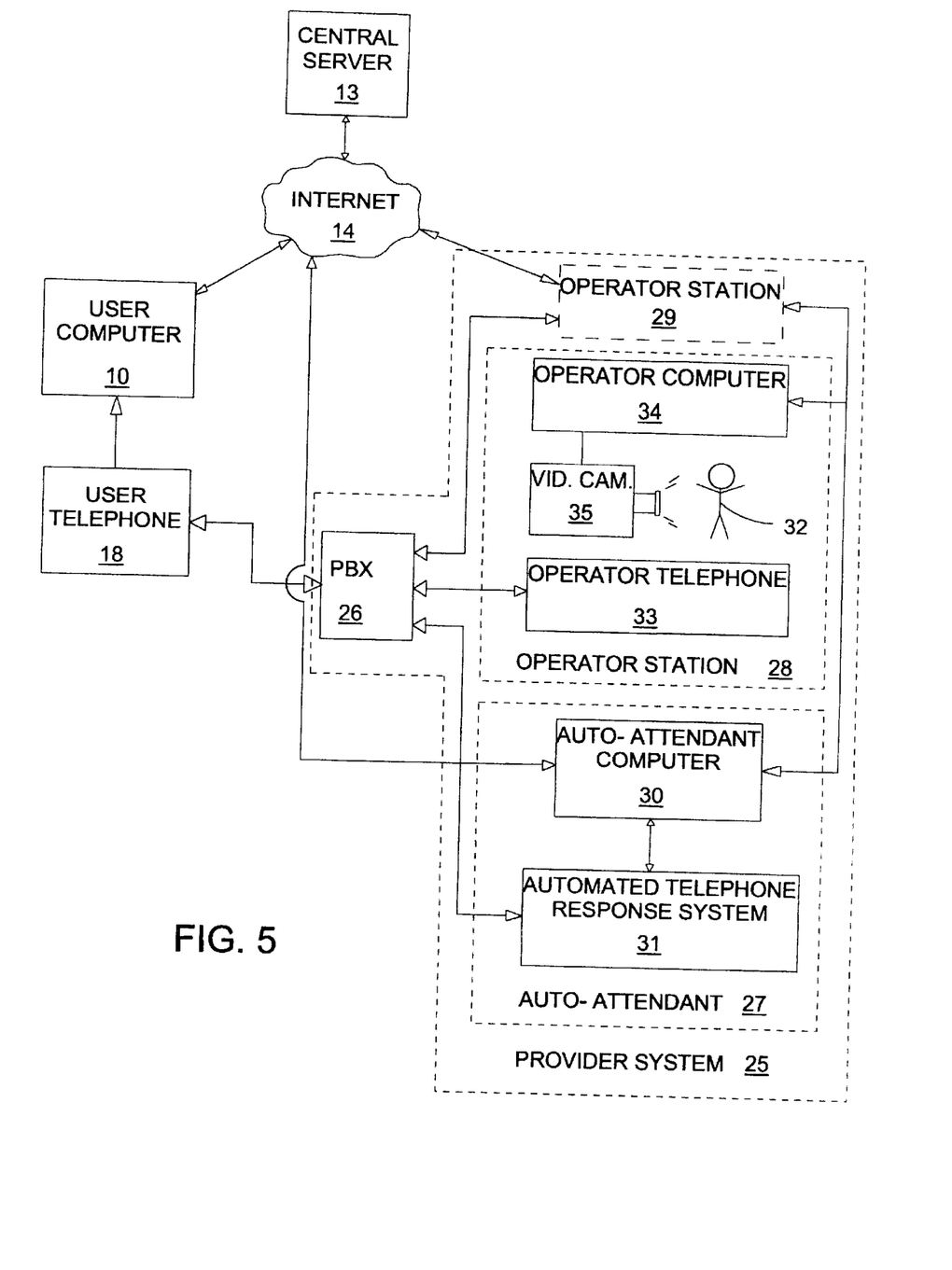
FIG. 5 is a block diagram of a first embodiment of a system for exchanging video image data between a user and both an auto-attendant and a live operator wherein the process for coordinating the data call is transparent to the user.

In FIG. 5, a provider system 25 includes a private branch exchange (PBX) 26, an auto-attendant 27, an operator station 28, and an operator station 29. PBX 26 receives telephone calls made to a primary telephone number of the provider and can couple any particular incoming call to any one of several telephones within provider system 25. A PBX system is not necessary if telephone calls can otherwise be transferred from auto-attendant 27 to an operator station.

The system shown in FIG. 5 is useful in many types of commercial or noncommercial enterprises. For example, a vendor of goods or services, such as a travel agency, can have incoming calls go to auto-attendant 27 so that the calling user can indicate the type of service desired (e.g., to allow the call to be forwarded to an operator specializing in certain types of travel). During the auto-attendant phase of a telephone call, it may also be desirable to present information to the caller about the travel agency or about the service they are requesting. This information may include audio information from auto-attendant 27 and preferably includes video information transmitted as part of a network data call (e.g., video clips or a slideshow of a highlighted vacation package). When the telephone call is eventually transferred to an agent, it is desirable to continue the video portion of the call so that 1) the caller can see the agent as part of a video telephony session, and/or 2) the agent can initiate other video images such as additional clips, slideshows, or text.

Provider system 25 may also function as a helpdesk or consultant for various kinds of information assistance. For example, a manufacturer or seller of electronic products requiring in-home set-up by the purchaser can provide a toll free telephone number for set-up assistance. The caller can be connected to auto-attendant 27 so that a particular video clip covering a specific product or question can be shown to the caller via the data network call (e.g., how to configure a VCR). If the caller needs assistance from a live operator, then the telephone call can be transferred. To maintain the video capability, the live operator is given control over the existing data call or a new data call is initiated by the operator's computer. The operator can then assist the caller using a live video telephony feed or by showing additional prerecorded clips, still images, or text.

As shown in FIG. 5, auto-attendant 27 includes an auto-attendant computer 30 and an automated telephone response system 31. Automated telephone response system 31 is coupled by a telephone line to PBX 26. Automated telephone response system 31 may be a separate hardware unit or may be comprised of hardware and software included in auto-attendant computer 30.

Provider system 25 may include many operator stations, but only two are shown to simplify the drawing. Operator station 28 includes a live operator or agent 32 using an operator telephone 33 and an operator computer 34. A video camera 35 is connected to computer 34 for sending images of operator 32 as part of a video telephony call. Operator telephone 33 is connected to PBX 26 so that a telephone call from a calling user can be transferred to operator 32. Operator computer 34 is coupled to Internet 14 so that a data call can be maintained with user computer 10. Auto-attendant computer 30 is networked with operator computer 34 (and the computers at other operator stations) in order to share caller information to facilitate transfer of an existing data call or creation of a new one. More specifically, user telephone 18 first establishes a telephone call to the provider system. A first data network session is established between user computer 10 and auto-attendant computer 30 using the database of central server 13. Auto-attendant computer 30 transmits predetermined or user selected video images to user computer 10. The telephone call is transferred or forwarded to operator telephone 33 (either automatically or in response to a signal from the calling user). A second data network session is established between operator computer 34 and user computer 10 and further video images are exchanged. The second data network session can be initiated by operator computer 34 based on user telephone number and/or IP address information shared by auto-attendant computer 30 or obtained by operator 32 from the calling user over the telephone call after it is transferred. Alternatively, a second data call is not necessary if the first data call can be handed off between computers (e.g., IP addresses of computers within provider system 25 can be dynamically reassigned).

Figure 6:
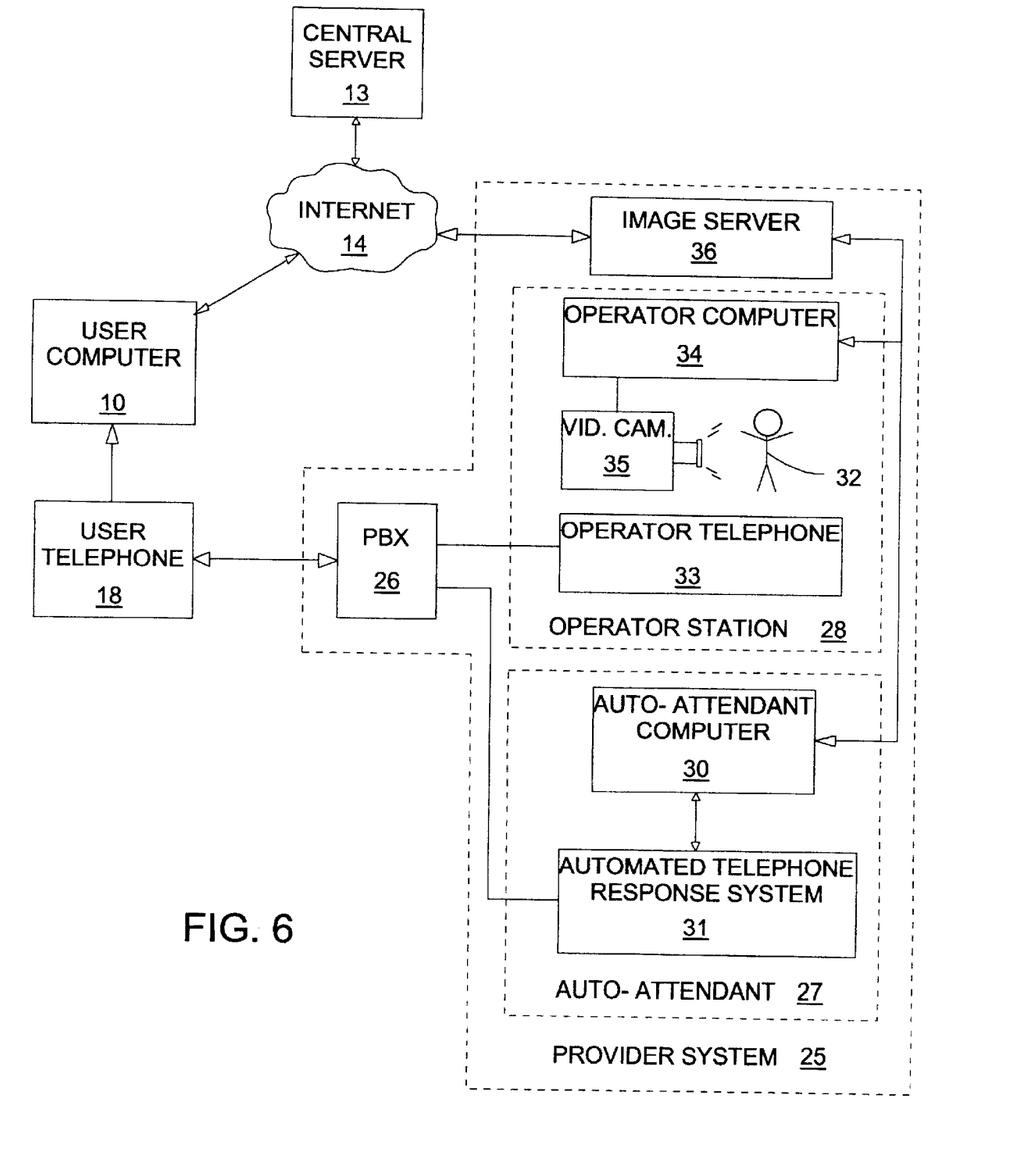
FIG. 6 is a block diagram of a second embodiment of a system for exchanging video image data between a user and both an auto-attendant and a live operator using an image server controllable by either the auto-attendant or the live operator.

FIG. 6 shows an alternative embodiment employing an image server 36 for serving all video images to user computer 10 (thereby requiring only one data network session). Image server 36 is coupled via a local network with auto-attendant computer 30 and operator computer 34, and is also coupled to Internet 14 (it is the IP address of image server 36 that is stored in the database of central server 13). Image server 36 preferably includes a call client that establishes a data call with user computer 10 and that can be subsequently controlled by either auto-attendant computer 30 or operator computer 34. A database of video images (e.g., prerecorded clips to be transmitted in streaming format, graphic images, or text displays) may preferably be stored in image server 36 for transmission within any current network data call in response to requests received from computers 30 or 34 over the local network. Alternatively, computers 30 or 34 may also supply the video data to image server 36 (e.g., a live video feed originating from video camera 35).

Figure 7:
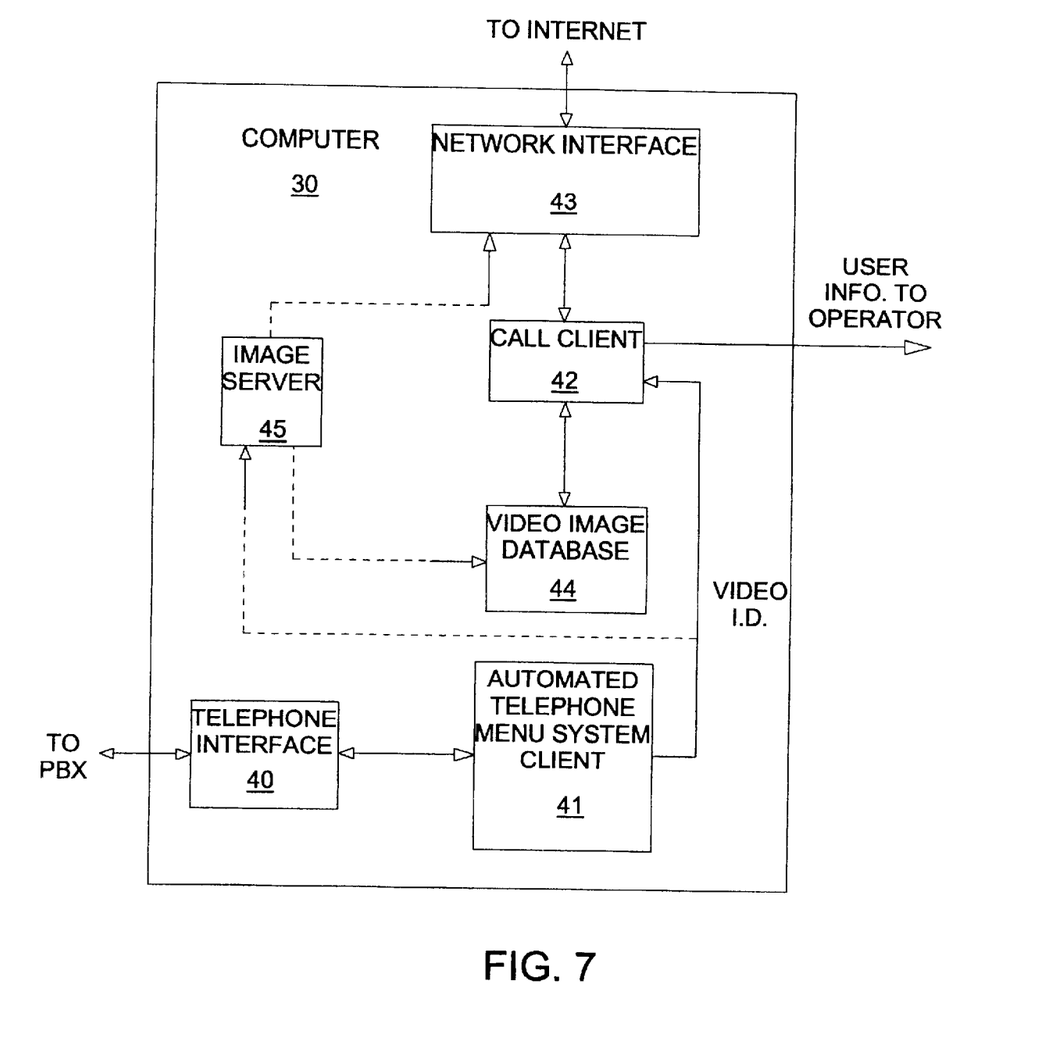
FIG. 7 is a block diagram showing an auto-attendant in greater detail.

FIG. 7 shows auto-attendant computer 30 (specifically configured for the embodiment of FIG. 5) in greater detail. Computer 30 includes a telephone interface 40 for interconnecting an automated telephone menu system client (i.e., software program) 41 to the PBX in order to receive telephone calls from calling users. Automated telephone menu system (ATMS) client 31 may be very similar to existing commercially available systems such as the PIVR Call Centre Solution from Pulse Software and Consulting of Markham, Ontario, Canada, for example.

ATMS client 41 is coupled to a call client 42 which effectuates the data network call via a network interface 43. ATMS client 41 presents selection menus to the caller using audio prompts transmitted via the telephone call. The menus may include choices for browsing to and then receiving particular video clips and choices for transferring to a live operator, for example. ATMS client 41 is responsive to return audio signals from the user (either DTMF tones or spoken commands) constituting their selection signals. Thus, telephone interface 40 and/or ATMS client 41 preferably include an DTMF tone detector and/or a voice recognition system. In an alternative embodiment, menu prompts from the ATMS client and return selection signals from the requestor can be signaled via the data call using As user selections are made within ATMS client 41, a video ID signal is provided to call client 42 to identify content in a video image database 44 contextually appropriate for the current location in the menu. Continuing with the travel agency example, if a calling user chooses to learn about Hawaiian vacations then ATMS client 31 sends an ID signal corresponding to current Hawaiian travel packages to call client 42. The identified video clip is then transmitted over the Internet to the user's computer. As described in co-pending application U.S. Ser. No. 10/058,549, a separate server client 45 may optionally be launched in parallel will call client 42 for purposes of streaming the video to the user.

Figure 8:
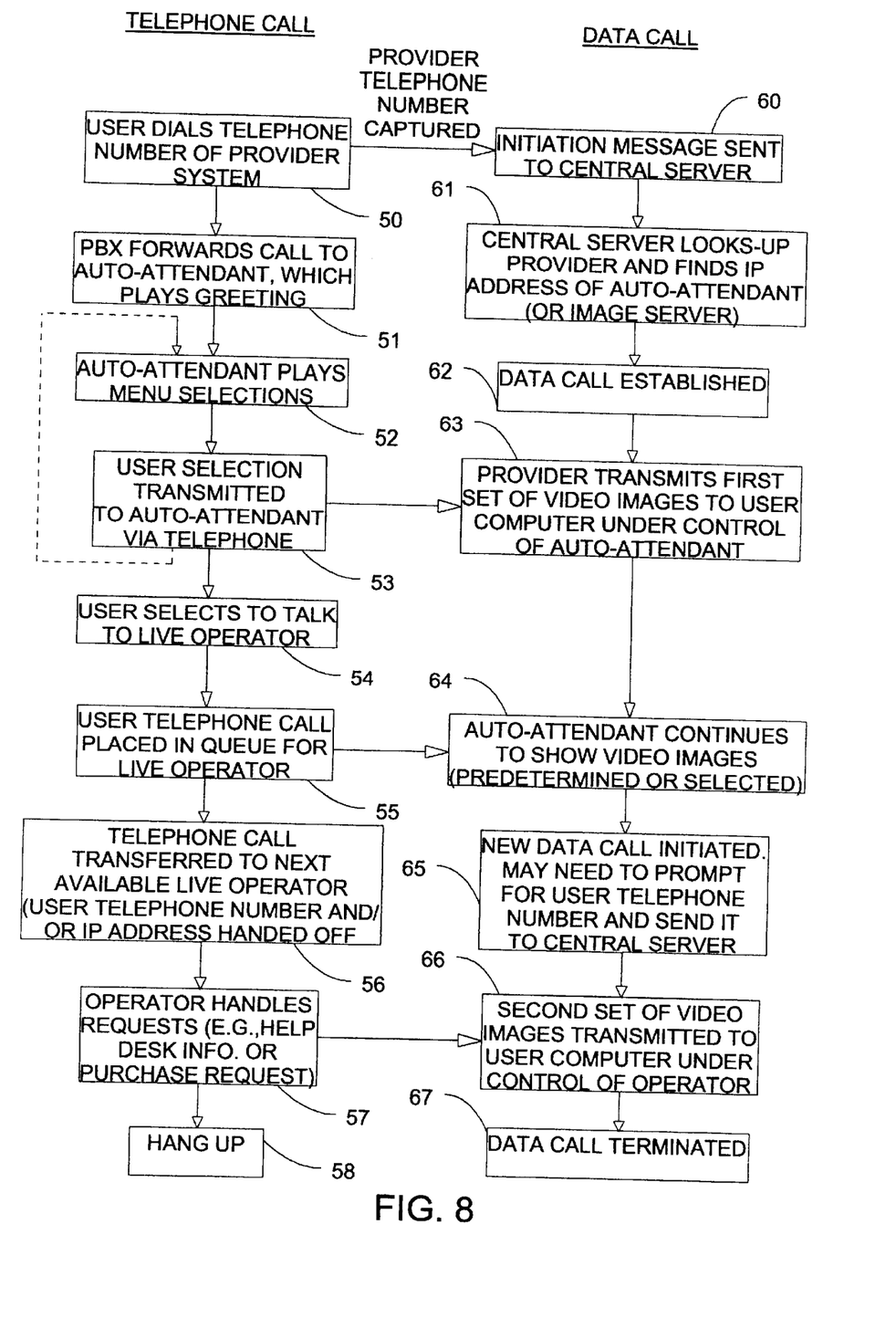
FIG. 8 is a flowchart showing a preferred method of the present invention for coordinating a telephone call in conjunction with a data call or data calls.

An overall method of the present invention is shown in greater detail in FIG. 8, wherein actions relating to the telephone call are on the left-hand side of the Figure and actions relating to the network data call are on the right-hand side. In step 50, the calling user dials the telephone number of the provider system. The provider's telephone number may have been obtained from print or television advertisements, from product documentation (e.g., a user's manual), or from a telephone book (e.g., yellow pages), for example. The dialed telephone number may be a direct line to the auto-attendant or a PBX may be included in the provider system. If there is a PBX, then the PBX automatically forwards the incoming telephone call to the auto-attendant. The auto-attendant receives the call and plays a greeting message in step 51. Various menus choices or prompts are played (e.g., audibly produced) by the auto-attendant in step 52. In step 53, the calling user indicates menu selections by transmitting selection input signals, such as DTMF tones or spoken commands.

As the telephone call progresses, a data call is also initiated. In a preferred embodiment, the dialed telephone number is captured by the user's computer and a data call initiation message is sent to the central server in step 60. In step 61, the central server looks up the provider's telephone number and retrieves the IP address of the auto-attendant (or of the image server in the alternative embodiment). The data call is then established between the user computer and the auto-attendant.

As selections are identified in step 53, a first set of corresponding video images are transmitted in step 63 by the provider to the user's computer under the control of the auto-attendant. As shown by the dashed line, menu prompts in step 52 and user responses in step 53 are repeated as the user navigates through the menu system. The calling user may also eventually decide in step 54 to request being connected to a live operator. Alternatively, a provider system could be structured such that all incoming telephone calls are forwarded to live operators after the caller has viewed a predetermined video clip, for example.

In step 55, the user's telephone call is placed into a queue for the next live operator available to take the call (or the next available specialist in a certain topic if one was requested). The auto-attendant may continue to transmit video images (either predetermined images or some selected by the user) while waiting for an operator.

In step 56, the operator becomes available and the telephone call is transferred. Preferably, the telephone number and/or IP address of the calling user are handed off from the auto-attendant to the operator's computer when the telephone call is transferred. This information may be obtained from the call client that established the initial data call, for example.

In a preferred embodiment, a new data call between the operator's computer and the user's computer is established in step 65. The data call can be initiated based upon the user's telephone number being forwarded to the central server. If the IP address of the user's computer is known, then the operator's computer could instead initiate a data call directly to that IP address. However, if a firewall is present, then the data call would still require sending at least some packets via the central server. In the alternative embodiment wherein an image server handles the data call during both the auto-attendant phase and the live operator phase, a new data call is not needed. Instead, the operator's computer obtains control of the selection of video images sent to the user. The operator computer preferably identifies the proper data call that is open between the image server and the user computer by means of the telephone number or IP address information handed off by the auto-attendant.

The operator speaks with the calling user and handles any requests in step 57. Such requests may include requests for information assistance (e.g., product or service helpdesk) or inquiries for purchasing goods or services. When appropriate, the operator may control the transmission of a second set of video images to the user's computer in step 66. Upon completion of the transaction, the telephone call is terminated in step 58 and the data call is terminated in step 67.

What is claimed is:

1. A method of video telephony wherein a user interacts with a provider system via a public switched telephone network and a computer network, said provider system including an auto-attendant resource, a live operator resource, and at least one provider computer, wherein a user computer and said provider computer are connected to said computer network for exchanging network packets therebetween, and wherein each of said computers has a respective private IP address within said computer network, said method comprising the steps of:

said user dialing a provider telephone number of said provider system from a user telephone having a user telephone number to establish a telephone call;

said auto-attendant resource answering said telephone call;

transmitting at least one of said provider telephone number or said user telephone number to a central server within said computer network;

maintaining within said central server a database of registered users and providers, their telephone numbers, and IP addresses of their computers;

checking said database for said transmitted telephone number;

if said transmitted telephone number is found, then establishing a first network session between said user computer and said provider computer;

transmitting first video images within said first network session from said provider computer to said user computer under control of said auto-attendant resource;

transferring said telephone call from said auto-attendant resource to said live operator resource; and transmitting second video images to said user computer under control of said live operator resource.

2. The method of claim 1 wherein transferring said telephone call from said auto-attendant resource to said live operator resource is performed in response to an input signal from said user transmitted within said telephone call.

3. The method of claim 1 wherein transferring said telephone call from said auto-attendant resource to said live operator resource is performed in response to said live operator resource becoming available.

4. The method of claim 1 wherein said live operator resource includes an operator computer coupled to said computer network, wherein said auto-attendant resource provides said user telephone number and/or an IP address corresponding to said user computer to said operator computer, and wherein a second network session is established between said user computer and said operator computer for transmitting said second video images to said user computer under control of said live operator resource.

5. The method of claim 1 wherein said provider computer comprises an image server coupled to said auto-attendant resource and said live operator resource for transmitting said first and second video images.

6. The method of claim 1 wherein said second video images are comprised of video telephony images showing a live operator.

7. The method of claim 1 wherein said second video images are comprised of prerecorded video clips relating to predetermined help topics.

8. The method of claim 1 wherein said first video images are comprised of prerecorded video clips relating to goods or services for sale by said provider system.

9. The method of claim 1 wherein said auto-attendant resource is comprised of an automated telephone menu system (ATMS) software program running on said provider computer.

10. A method for providing communication between a user and an information provider, said user having a user computer and a user telephone with a user telephone number, said provider having an auto-attendant system, a live operator, and a live operator computer, wherein said user computer and said live operator computer are connected to a computer network for exchanging network packets therebetween, wherein each of said computers has a respective private IP address within said computer network, and wherein a central server connected to said computer network provides a database of registered users and providers, their telephone numbers, and IP addresses of their computers, said method comprising the steps of:

establishing a telephone call between said user telephone and said auto-attendant system via a public switched telephone network;

establishing a first network session between said user computer and said auto-attendant system via said computer network using said database of said central server;

transmitting first video images within said first network session from said auto-attendant system to said user computer;

transferring said telephone call from said auto-attendant system to said live operator;

establishing a second network session between said live operator computer and said user computer via said computer network; and transferring second video images within said second network session from said live operator computer to said user computer.

11. The method of claim 10 further comprising the step of:

coupling said user telephone number and/or an IP address corresponding to said user computer to said live operator computer so that said live operator computer establishes said second network session.

12. A method for providing communication between a user and an information provider, said user having a user computer and a user telephone with a user telephone number, said provider having an auto-attendant system, a live operator, and an image server, wherein said user computer and said image server are connected to a computer network for exchanging network packets therebetween, wherein said user computer and said image server have respective private IP addresses within said computer network, and wherein a central server connected to said computer network provides a database of registered users and providers, their telephone numbers, and IP addresses of their computers, said method comprising the steps of:

establishing a telephone call between said user telephone and said auto-attendant system via a public switched telephone network;

establishing a network session between said user computer and said image server via said computer network using said database of said central server;

transmitting first video images within said network session from said image server to said user computer under control of said auto-attendant system;

transferring said telephone call from said auto-attendant system to said live operator; and transferring second video images within said network session from said image server to said user computer under control of said live operator.

13. Apparatus for responding to a telephone call made to a predetermined telephone number by a remote user, said remote user having a user computer coupled to an internetwork, said apparatus comprising:

an automated telephone response system for automatically answering said telephone call and presenting a menu of selections corresponding to desired information or transactions, said automated telephone response system queuing said telephone call in a queue with other calls from other users;

a live operator station for having said telephone call transferred thereto when leaving said queue;

a network interface coupled to said internetwork for communicating with a central server within said internetwork, said central server containing a database of registered providers with their respective telephone numbers and respective IP addresses of provider computers, said database including an IP address assigned to said network interface and said predetermined telephone number;

a data call client communicating through said network interface with said central server to establish a data call between said apparatus and said user computer; and a video image source for providing video images to said user computer via said data call and under control of said automated telephone response system while said telephone call is in said queue and under control of said live operator station after said telephone call is transferred to said live operator station.

14. The apparatus of claim 13 wherein said video image source and said data call client reside in a local server controllable by both said automated telephone response system and said live operator station.

15. The apparatus of claim 13 wherein said video image source includes a first database of prerecorded video clips controllable by said automated telephone response system.

16. The apparatus of claim 15 wherein said video image source further includes a live video feed under control of said live operator station.

17. The apparatus of claim 16 wherein said video image source further includes a second database of prerecorded video clips controllable by said live operator station.

18. The apparatus of claim 13 wherein said video image source includes prerecorded video clips relating to predetermined help topics.

19. The apparatus of claim 13 wherein said video image source includes prerecorded video clips relating to predetermined goods or services available for sale to said remote user.

* * * * *